United States Patent
Brekelbaum et al.

(10) Patent No.: US 10,387,320 B2
(45) Date of Patent: Aug. 20, 2019

(54) INTEGRATED CONFIRMATION QUEUES

(71) Applicant: Samsung Electronics Co., Ltd., Suwon-si, Gyeonggi-do (KR)

(72) Inventors: Edward A. Brekelbaum, Austin, TX (US); Ankit Ghiya, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 59 days.

(21) Appl. No.: 15/665,401

(22) Filed: Jul. 31, 2017

(65) Prior Publication Data

US 2018/0329821 A1 Nov. 15, 2018

Related U.S. Application Data

(60) Provisional application No. 62/505,836, filed on May 12, 2017.

(51) Int. Cl.
*G06F 12/00* (2006.01)
*G06F 12/0862* (2016.01)
*G06F 12/1009* (2016.01)

(52) U.S. Cl.
CPC ...... *G06F 12/0862* (2013.01); *G06F 12/1009* (2013.01); *G06F 2212/602* (2013.01); *G06F 2212/65* (2013.01)

(58) Field of Classification Search
None
See application file for complete search history.

(56) References Cited

U.S. PATENT DOCUMENTS

| | | | |
|---|---|---|---|
| 6,134,633 A | 10/2000 | Jacobs | |
| 6,654,837 B1 | 11/2003 | Hill et al. | |
| 7,127,574 B2 | 10/2006 | Rotithor et al. | |
| 8,397,049 B2 | 3/2013 | Wang et al. | |
| 9,098,418 B2 | 8/2015 | Kannan et al. | |
| 2004/0003179 A1 | 1/2004 | Shirahige et al. | |
| 2006/0143401 A1 | 6/2006 | Doweck et al. | |
| 2006/0179238 A1* | 8/2006 | Griswell, Jr. | G06F 9/30043 711/137 |
| 2006/0248280 A1 | 11/2006 | Al-Sukhni et al. | |
| 2009/0070556 A1 | 3/2009 | Griswell, Jr. et al. | |
| 2014/0149678 A1 | 5/2014 | Chaudhary | |
| 2016/0019155 A1* | 1/2016 | Radhakrishnan | G06F 12/0862 711/137 |

* cited by examiner

*Primary Examiner* — John A Lane
(74) *Attorney, Agent, or Firm* — Renaissance IP Law Group LLP

(57) ABSTRACT

According to one general aspect, an apparatus may include a cache pre-fetcher configured to predict data to be retrieved from a memory system. The cache pre-fetcher may include a pattern predictor circuit and a confirmation queue circuit. The pattern predictor circuit may be configured to predict a series of memory addresses to be pre-fetched from the memory system. The confirmation queue circuit may be configured to: maintain a windowed confirmation queue of predicted memory addresses, compare a requested memory address against the predicted memory addresses, and, if the requested memory address is included in the predicted memory addresses, indicate that a successful pre-fetch has occurred.

20 Claims, 6 Drawing Sheets

INTEGRATED CONFIRMATION QUEUES

CROSS-REFERENCE TO RELATED APPLICATION

This application claims priority under 35 U.S.C. § 119 to Provisional Patent Application Ser. No. 62/505,836, entitled "INTEGRATED CONFIRMATION QUEUES" filed on May 12, 2017. The subject matter of this earlier filed application is hereby incorporated by reference.

TECHNICAL FIELD

The present disclosure description relates in general to computer processors. In particular, the present disclosure relates to integrated confirmation queues.

BACKGROUND

A computer processor typically uses cache prefetching to boost execution performance by fetching an instruction or data from their original storage in slower memory to a faster local memory before the instruction or data is actually needed. For example, a processor requests an instruction or data block from main memory before the instruction or data block is actually needed and places the corresponding instruction or data block in a cache. When the instruction or data block is actually needed, it can be accessed much more quickly from the cache than if it had to be requested from the main memory. Prefetching hides memory access latency. As data access patterns show less regularity than instruction patterns, accurate data prefetching is generally more challenging than instruction prefetching.

In the context of prefetching, the degree is the number of cache lines prefetched or predicted ahead of time in a prefetching operation. Prefetch distance shows how far ahead of the demand access stream, the data blocks are prefetched. A prefetch operation is useful or useless depending on whether the item brought by it prevents or does not prevent a future cache miss. A prefetch operation is harmful if the item brought by it replaces a useful block and thus, possibly increases the cache misses. Harmful prefetches lead to cache pollution. A prefetch operation is redundant if the data-block brought by it is already present in cache.

In order for a data prefetcher to cover dynamic random access memory (DRAM) access latency, the data prefetcher often gets many accesses ahead of the demand stream. However, issuing many incorrect prefetches may overload the memory system and reduce throughput. Furthermore, a confirmation queue for a computer processor may require a large content addressable memory (CAM) structure with high power consumption, uses large area, and timing critical. Generally, a confirmation queue is a CAM that checks incoming virtual or memory addresses against all entries. Such a large CAM has slower speed. A larger CAM structure requires higher power, and potentially causes speed path issues since multi-cycle adds complexity.

SUMMARY

According to one general aspect, an apparatus may include a cache pre-fetcher configured to predict data to be retrieved from a memory system. The cache pre-fetcher may include a pattern predictor circuit and a confirmation queue circuit. The pattern predictor circuit may be configured to predict a series of memory addresses to be pre-fetched from the memory system. The confirmation queue circuit may be configured to: maintain a windowed confirmation queue of predicted memory addresses, compare a requested memory address against the predicted memory addresses, and, if the requested memory address is included in the predicted memory addresses, indicate that a successful pre-fetch has occurred.

According to another general aspect, a method may include predicting a series of memory addresses to be pre-fetched from a memory system. The method may include maintaining a windowed confirmation queue of predicted memory addresses. The method may include comparing a requested memory address against the predicted memory addresses. The method may also include, if the requested memory address is included in the predicted memory addresses, indicating that a successful pre-fetch has occurred.

The details of one or more implementations are set forth in the accompanying drawings and the description below. Other features will be apparent from the description and drawings, and from the claims.

A system and/or method for integrated confirmation queues, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
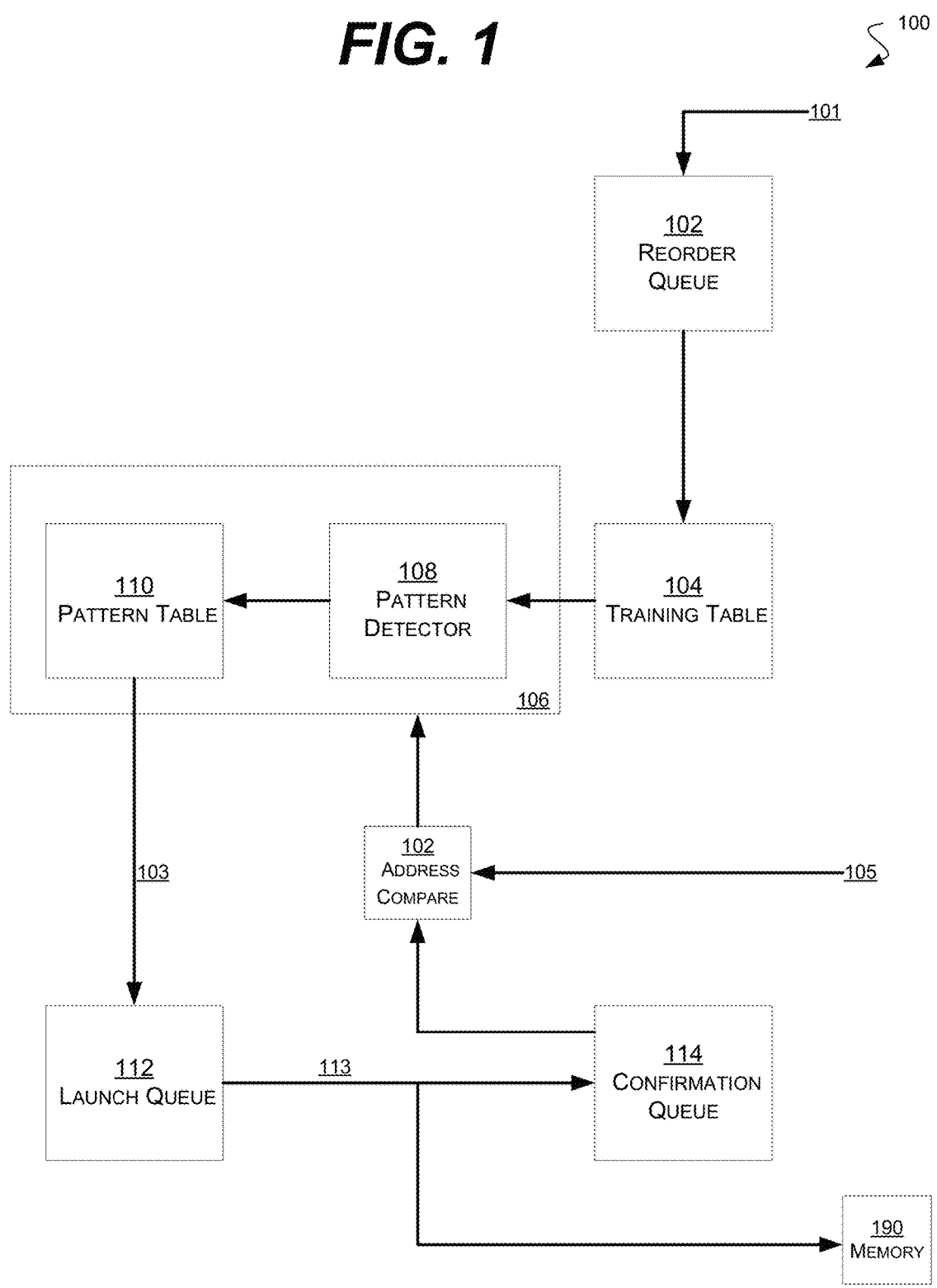
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a processor, a system-on-a-chip (SoC), a portion of a memory system or cache. In one embodiment, the system 100 may include a prefetcher in a cache (e.g., a level 1 (L1) cache), according to one embodiment.

In one such embodiment, addresses 101 may be sent, in program order, to the system 100. In various embodiments, due to the out-of-nature of virtual address generation, stride-patterns may not be detected in the address stream. In the illustrated embodiment, the system 100 may include a reorder queue 102. The reorder queue may be configured to queue the addresses 101 in program order.

The system 100 may be configured to detect strides between cache-line accesses. In the illustrated embodiment, the system 100 may include a training table 104. A training table 104 may be configured to compute strides and maintain the stride history for an address stream in a region. In such an embodiment, on a new stride computation, the training table 104 sends the stride pattern for the stream to a pattern predictor circuit 106.

In the illustrated embodiment, the pattern predictor circuit 106 may include a pattern detector unit or circuit 108 and a pattern table 110. In various embodiments, the pattern detection unit 108 may be configured to detect single or multi-stride patterns, and send the detected strides to the pattern table 110. In various embodiments, the tables and queues (e.g., the pattern table 110) may include memory elements to store the relevant data and circuitry or logic to manipulate or maintain the data as described herein.

In various embodiments, the pattern table 110 may be configured to store the detected strides for address streams in separate regions (e.g., 4K). The pattern table 110 or, more generally, the pattern predictor circuit 106 may be configured to generate prefetch addresses or predicted memory addresses 103 based on the detected stride patterns.

In the illustrated embodiment, the predicted memory address 103 may be entered into a launch queue 112. The launch queue 112 decouples the pattern predictor circuit 106 from the memory system 190. The launch queue 112 may, in turn, retrieve the predicted memory addresses 103 from the memory system 190 (e.g., a level 2 (L2) cache, main memory). As the processor or instruction flow has not actually requested the memory address, the predicted memory address 103 is considered pre-fetched or speculatively fetched. In such an embodiment, the latency or time required to fetch data from the memory system 190 may be hidden from the processor.

In the illustrated embodiment, the system 100 may include a confirmation queue 114. In such an embodiment, the confirmation queue 114 may be configured to track the accuracy of prefetch generation. The confirmation queue 114 mat be configured to store the launched or predicted prefetch addresses 113 and then match them against demand accesses or actually requested memory addresses 105.

In various embodiments, a load-store unit (LSU) may request various memory addresses 105 as required by the instructions executed by the processor. It is these actually requested memory addresses 105 that the prefetcher or system 100 attempted to accurately predict and request ahead of time (pre-fetch).

In such an embodiment, the requested memory address 105 is compared against the entries in the confirmation queue 114. The confirmation queue 114 is generally a content-addressable-memory (CAM); although it is understood that the above is merely one illustrative example to which the disclosed subject matter is not limited.

In various embodiments, if the requested memory address 105 is successfully predicted (a hit), information that a hit occurred is feedback into the pattern predictor circuit 106. Likewise, if the requested memory address 105 is not successfully predicted (a miss), information that a miss occurred is also feedback into the pattern predictor circuit 106. In such an embodiment, the pattern predictor circuit 106 attempts to improve its prediction abilities.

Figure 2:
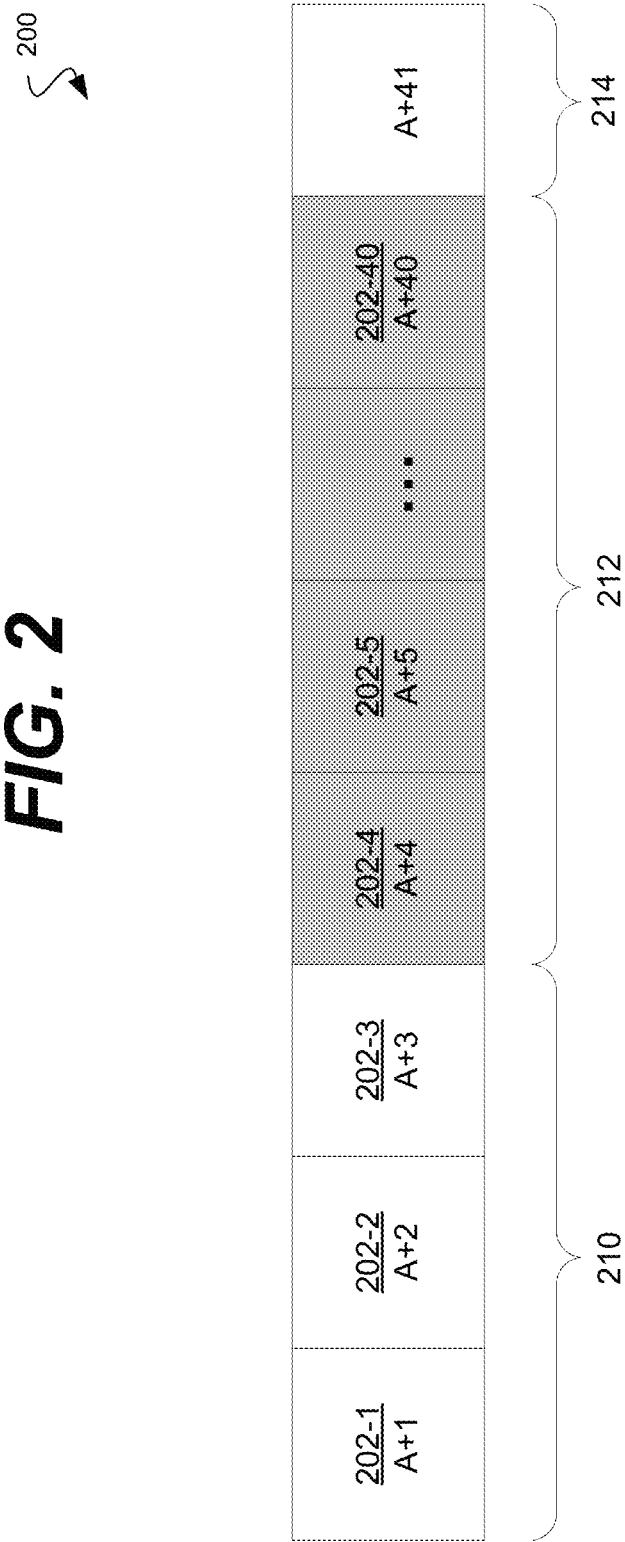
FIG. 2 is a block diagram of an example embodiment of an apparatus in accordance with the disclosed subject matter.

FIG. 2 is a block diagram of an example embodiment of an apparatus confirmation queue 200 in accordance with the disclosed subject matter. In various embodiments, the apparatus 200 may include a portion of a confirmation queue, as described above. In such an embodiment, the apparatus 200 may include a plurality of memory elements.

In the illustrated embodiment, the apparatus 200 may include a plurality of memory elements 202-1, 202-2, and 202-3. In various embodiments, as a memory address is predicted and pre-fetched, it is entered into the confirmation queue 200. For example, memory address A+1 is stored in element 202-1, memory address A+2 is stored in element 202-2, memory address A+3 is stored in element 202-3.

In a traditional confirmation queue, the number of memory addresses that could be pre-fetched would be limited by the number of memory elements in the confirmation queue. If, for example, there were 40 entries (or memory elements) in the confirmation queue, then up to 40 memory addresses could be pre-fetched. In various embodiments, less than 40 memory addresses may actually be pre-fetched due to, for example, lack of confidence in the prediction ability. As the desire to increase the depth of a pre-fetch engine increased the size of the confirmation queue increased. As the confirmation queue is traditionally a CAM, an increase in size tended to be very expensive, in terms of size, power consumption, and timing requirements.

In the illustrated embodiment, the confirmation queue 200 includes a windowed confirmation queue 210 of predicted memory addresses A+1, A+2, and A+3. In such an embodiment, the confirmation queue 200 may not include every predicted memory address, as is done traditionally. Instead it may maintain or store a sub-set of predicted memory addresses (those within a window of addresses 210).

In such an embodiment, predicted memory addresses outside that window 210 (e.g., in the region 212) may be discarded or otherwise not entered or added to the confirmation queue 200. In such an embodiment, the confirmation queue 200 may include a far smaller number of memory elements (elements 202-1, 202-2, and 202-3) than the traditional queue (which would include elements 202-1 to 202-40).

In various embodiments, the window size may vary based upon the embodiment. In the illustrated embodiment, the window size may include 3 predicted memory addresses. In such an embodiment, the confirmation queue 200 may be roughly 15% the size of a 40 entry queue that employs the traditional style. It is understood that the above is merely one illustrative example to which the disclosed subject matter is not limited.

In such an embodiment, as requested memory addresses are fetched or requested by the LSU, the requested memory address may be checked against the windowed memory addresses (in region 210). If an address matches, the matching (and/or skipped), predicted memory addresses may be removed or purged from the queue 200.

For example, if predicted memory address A+1 matches a requested memory address, the address A+1 may be removed from the queue 200. The other predicted memory addresses, in one embodiment, may be shifted down or along the queue 200. Therefore, memory address A+2 may be moved to element 202-1 and memory address A+3 may be moved to element 202-2. This will leave an empty element 202-3, as, in the windowed confirmation queue 210, there is no stored memory address A+4 to shift in that element 202-3.

In such an embodiment, the confirmation queue 200 or the pattern predictor circuit may dynamically re-predict or re-generate the predicted memory address A+4. This newly re-predicted memory address A+4 may be placed at the end of the windowed confirmation queue 210 (element 202-3). In such an embodiment, the windowed confirmation queue 210 may be constantly filled (assuming there are at least as many predicted memory addresses as there are entries in the windowed confirmation queue 210), but the hardware requirements of the traditional confirmation queue are avoided.

In such an embodiment, it may be more desirable to have the pattern predictor circuit perform the prediction of a memory address multiple times (e.g., twice) instead of storing all of the original predictions. Further, in various embodiments, the pattern predictor circuit may be configured to make the second or re-prediction based upon an updated confidence level. In such an embodiment, the feedback provided by the confirmation queue 200 to the pattern predictor circuit may be based upon the most current prediction scheme employed by the pattern predictor circuit, and not the prediction scheme the pattern predictor circuit employed 20 (for example) memory addresses ago. It is understood that the above is merely one illustrative example to which the disclosed subject matter is not limited.

In the illustrated embodiment, as a new memory address is predicted (e.g., address A+41 as shown as block 214) the confirmation queue 200 determines if the windowed confirmation queue 210 is full or has unused space (e.g., if only 2 outstanding predicted memory addresses existed). If the windowed confirmation queue 210 has unused space (e.g., at the beginning of a stream of addresses), the latest predicted memory address A+41 may be entered into the end of the windowed confirmation queue 210 (e.g., element 202-3 if 2 addresses are already present, elements 202-2 or even 202-1 otherwise). If the windowed confirmation queue 210 is full, the newest predicted memory address may be discarded, or the confirmation queue 200 may refrain from adding the newest predicted memory address A+41 to the windowed confirmation queue 210.

Figure 3:
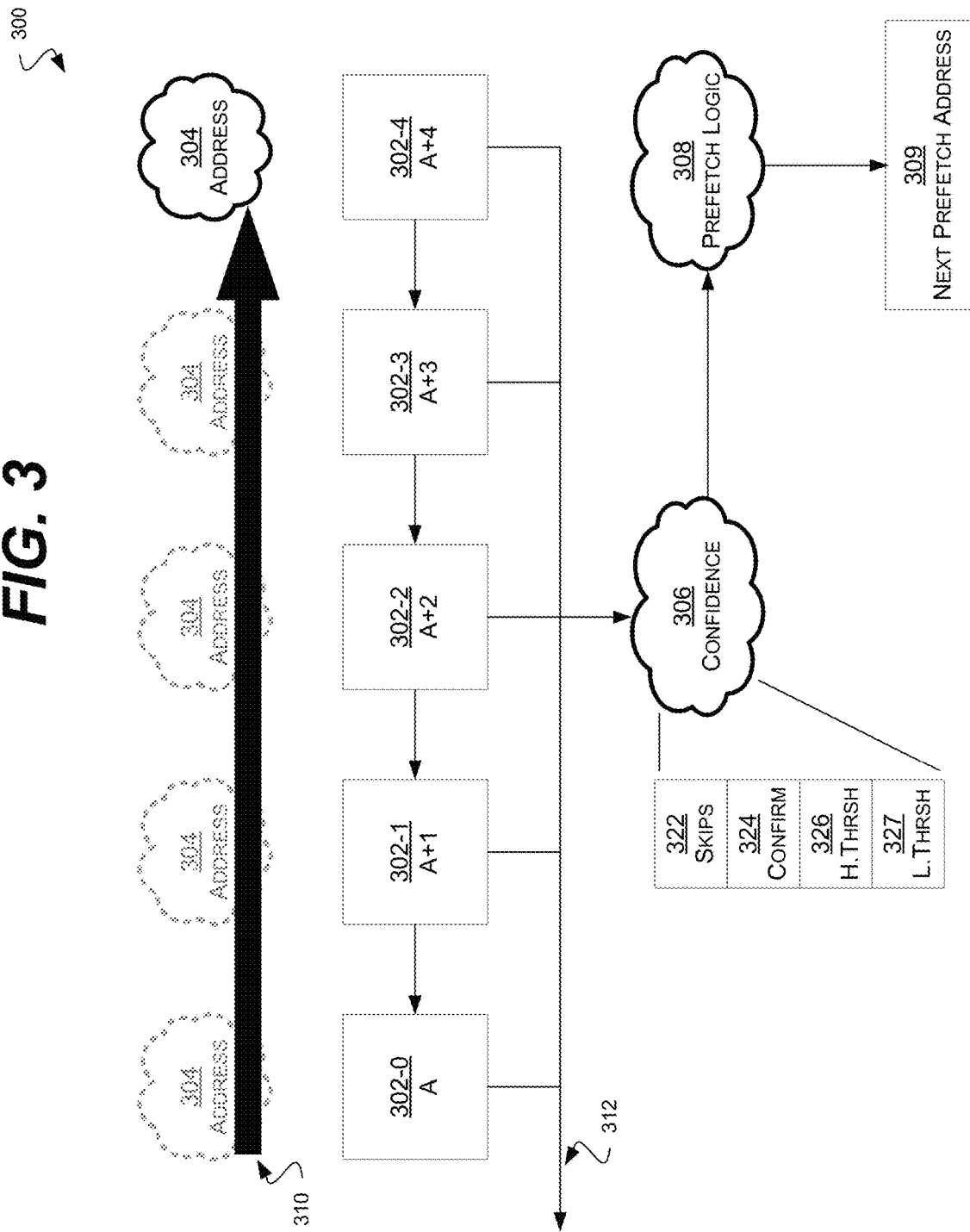
FIG. 3 is a block diagram of an example embodiment of an apparatus in accordance with the disclosed subject matter.

FIG. 3 is a block diagram of an example embodiment of an apparatus or confirmation queue 300 in accordance with the disclosed subject matter. In the illustrated embodiment, the checking of a requested memory address against the confirmation queue 300 is shown in more detail. It is understood that the above is merely one illustrative example to which the disclosed subject matter is not limited.

In the illustrated embodiment, the confirmation queue 300 includes a windowed confirmation queue with 5 entries. This windowed confirmation queue includes elements 302-0, 302-1, 302-2, 302-3, and 302-4. It is understood that the above is merely one illustrative example to which the disclosed subject matter is not limited.

In the illustrated embodiment, the elements 302-0, 302-1, 302-2, 302-3, and 302-4 may store the predicted memory addresses A, A+1, A+2, A+3, and A+4, respectively. It is understood that while the memory addresses are labeled as being incremented by 1 (e.g., A+1, A+2) that that is merely the order in which they were predicted, not the difference in the memory address itself (e.g., address value 0xFED6 B072). It is understood that the memory addresses themselves may include strides or may generally be non-contiguous.

In the illustrated embodiment, when a memory address 304 is actually requested by the LSU, it is checked against the predicted memory addresses in the windowed confirmation queue 300. Arrow 310 illustrates the requested memory address 304 being checked against the predicted memory addresses A, A+1, A+2, A+3, and A+4 in order from oldest to most recent. In some embodiments, this comparison may be done in parallel.

In various embodiments, if any of the predicated memory addresses A, A+1, A+2, A+3, and A+4 within the window match the requested memory address 304, a confirmation queue hit signal 312 may be generated. In various embodiments, the confirmation queue hit signal 312 may indicate to the pattern predictor circuit that a successful pre-fetch has occurred.

In one embodiment, this confirmation queue hit signal 312 may simply include a binary signal. In another embodiment, the confirmation queue hit signal 312 may include information as to which memory element (e.g., elements 302-0, 302-1, 302-2, 302-3, or 302-4) included the requested address 304. In another embodiment, the confirmation queue hit signal 312 may not detail specifically which element(s) included the requested address 304, but how many elements deep in the queue the first (often the only) iteration of the requested address 304 was to be found. In such an embodiment, the number of elements that occurred in the queue before the requested address 304 was found is referred to as the number of skips that occurred.

In various embodiments, the skip count and matching element number may be factored into a measure of confidence 306 in the predictive ability of the prefetch engine. In some embodiments, the configuration queue 300 or the prefetch engine may be configured to determine a level of confidence 306 associated with the prefetch predictions. In such an embodiment, the level of confidence 306 may determine or be considered when deciding how may memory addresses ahead to prefetch (i.e. the degree of prefetching) or other prefetching parameters.

In the illustrated embodiment, the level of confidence 306 may include the number of skips 322 and whether or not a match was found (i.e., a confirmation or confirm 324). In such an embodiment, a confirmation 324 may be the primary determinant of the confidence level 306, but it may be tempered by the number of skips 322. For example, if a match was found but the queue 300 had to skip a number of elements to find that match, any increase in the level of confidence 306 may be tempered.

In another embodiment, the queue 300 may be divided into a first or earlier portion, and a second or later portion. In one embodiment, the first portion may include the elements 302-0 and the 302-1, and the second portion may include elements 302-2, 302-3, and 302-4. In one embodiment, this division may be roughly the half-way point of the confirmation queue 300. In such an embodiment, a skip may only be considered to have occurred if the match does not occur until the later portion. In such an embodiment, a form of thresholding may occur in the analysis of skips. In another embodiment, finer levels of granularity in skips may be employed (e.g., the queue 300 may be divided into 3 or more portions). It is understood that the above are merely a few illustrative examples to which the disclosed subject matter is not limited.

In the illustrated embodiment, the level of confidence 306 may be feedback to the prefetch logic 308 (e.g., part of the pattern predictor circuit). is the prefetch logic 308 may use this information to improve its prediction of the next prefetch address 309.

In various embodiments, the queue 300 may employ a maximum threshold value 326 or a minimum threshold value 327 to determine if the level of confidence 306 presented to the prefetch logic 308 should be changed. In one embodiment, if the number of confirmations 324 is greater than or equal to the maximum threshold value 326 the level of confidence 306 may be increased. If the number of confirmations 324 is less than the minimum threshold value 327 the level of confidence 306 may be decreased.

In various embodiments, the number of skips 322 may be included in the threshold determination. For example, the threshold determination may be based upon the confirmation 324 minus the existence of a skip 322. In another embodiment, the confidence level 306 may only be periodically updated, and a count of confirmations 324 and/or skips 322 may be employed. It is understood that the above are merely a few illustrative examples to which the disclosed subject matter is not limited.

Figure 4:
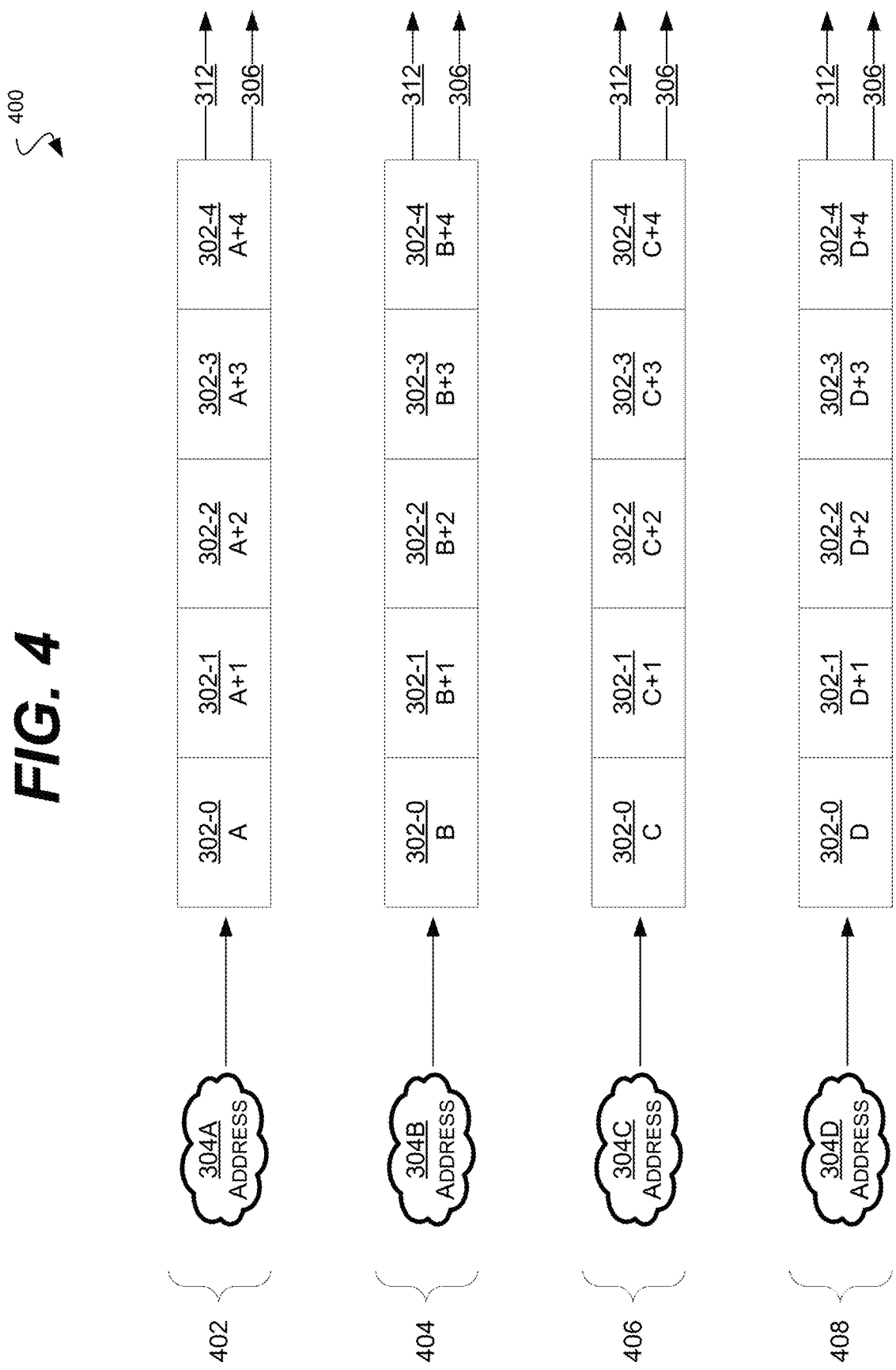
FIG. 4 is a block diagram of an example embodiment of an apparatus in accordance with the disclosed subject matter.

FIG. 4 is a block diagram of an example embodiment of an apparatus 400 in accordance with the disclosed subject matter. In various embodiments, the apparatus 400 may include a plurality of confirmation queues, or a single memory structure partitioned into multiple queues.

In the illustrated embodiment, the prefetch engine may be configured to prefetch data for a plurality of streams or series of instructions/data. In such an embodiment, the prefetch engine may maintain a separate windowed confirmation queue for each instruction stream. For example, in the illustrated embodiment, the windowed confirmation queues 402, 404, 406, and 408 may be created or employed.

In such an embodiment, each windowed confirmation queues 402, 404, 406, and 408 may include respective versions of the memory elements 302-0, 302-1, 302-2, 302-3, and 302-4. Further, in such an embodiment, each windowed confirmation queues 402, 404, 406, and 408 may output respective versions of the confirmation hit signal 312 and the confidence 306. In various embodiments, the confirmation hit signal 312 and the confidence 306 may be combined, as described above.

In one embodiment, each windowed confirmation queue 402, 404, 406, and 408 may be associated with a respective stream of data (e.g., the stream addresses labeled A, B, C, and D). In such an embodiment, the pattern predictor circuit may predict respective streams or sets of predicted memory addresses and populate the windowed confirmation queue 402, 404, 406, and 408 with those addresses. For example, the windowed confirmation queue 402 may include the predicted addresses A, A+1, A+2, A+3, and A+4. The windowed confirmation queue 404 may include the predicted addresses B, B+1, B+2, B+3, and B+4. The windowed confirmation queue 406 may include the predicted addresses C, C+1, C+2, C+3, and C+4. The windowed confirmation queue 408 may include the predicted addresses D, D+1, D+2, D+3, and D+4.

In such an embodiment, as new actual memory addresses are requested (e.g., addresses 304A, 304B, 304C, and 304D), those requested memory address will be matched against the respective windowed confirmation queue 402, 404, 406, or 408. The matching (or lack thereof) of the stream's requested memory address against the stream's predicted memory addresses may be used to generate the stream's confirmation hit signal 312 and the confidence 306, as described above.

In various embodiments, the windowed confirmation queue 402, 404, 406, or 408 may all include the same depth or number of entries (e.g., 5 in the illustrated embodiment). In another embodiment, the number of entries per stream may vary. In another embodiment, the number of entries or size of the window may be dynamically allocated at the start of a stream. In yet another embodiment, the number of entries or size of the window may be dynamically adjusted based upon the level of confidence or pre-fetching depth. It is understood that the above are merely a few illustrative examples to which the disclosed subject matter is not limited.

Figure 5:
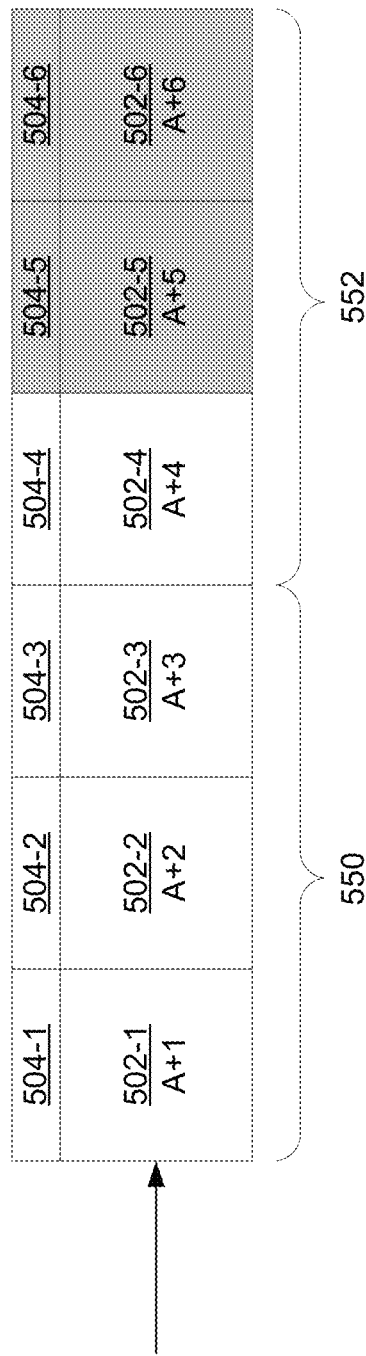
FIG. 5 is a block diagram of an example embodiment of an apparatus in accordance with the disclosed subject matter.

FIG. 5 is a block diagram of an example embodiment of an apparatus or confirmation queue 500 in accordance with the disclosed subject matter. In the illustrated embodiment, the confirmation queue 500 includes 6 elements or entries. It is understood that the above is merely one illustrative example to which the disclosed subject matter is not limited.

In various embodiments, the windowed confirmation queue 500 may be separated or disconnected from the actual pre-fetching of the data. In some embodiments, addresses (e.g., address A+5) may only be entered into the confirmation queue at the same time it is entered into or requested by the launch queue. In such an embodiment, the windowed confirmation queue 500 may only include predicted addresses that have been pre-fetched.

In the illustrated embodiment, the windowed confirmation queue 500 may include addresses that have not been fetched from the memory system. In such an embodiment, the windowed confirmation queue 500 may be able to train the predictor circuit even if the requested address was not actually pre-fetched (e.g., due to contention for the memory system).

In the illustrated embodiment, the addresses A+1 (stored in element 502-1), A+2 (stored in element 502-2), A+3 (stored in element 502-3), and A+4 (stored in element 502-4) may have actually been pre-fetched by the prefetcher circuit. Conversely, the addresses A+5 (stored in element 502-5), and A+6 (stored in element 502-6) may not have been pre-fetched but may be predicted. In one embodiment, the launch queue may not have requested them from the memory system yet, or the addresses may not even be entered into the launch queue.

In such an embodiment, if an actual address 506 is requested by the LSU, it may be compared against both the predicted and pre-fetched addresses (A+1, A+2, A+3, and A+4), and the predicted but not pre-fetched addresses (A+5 and A+6). In such an embodiment, the windowed confirmation queue 500 may always be full and may always allow for the most through testing and feedback of the prediction scheme. In such an embodiment, the windowed confirmation queue may be able to maintain a lock on predicted addresses even if the actual demand or address requests get ahead of prefetches.

In one embodiment, the windowed confirmation queue 500 may include a tag or metadata (tag 504-1, 504-2, 504-3, 504-4, 504-5, and 504-6) that indicate whether or not the predicted address has been pre-fetched. In another embodiment, these tags may not be employed. It is understood that the above are merely a few illustrative examples to which the disclosed subject matter is not limited.

In one embodiment, returning to the concept of skips, the confirmation queue may be divided into an earlier portion 550 and a later portion 552. In the illustrated embodiment, this portioning into portions 550 and 552 may occur irrespective of the pre-fetched nature of the memory addresses (e.g., address A+4 is pre-fetched but still in the late portion 552). In another embodiment, the portions may be based upon the pre-fetched state of the addresses. It is understood that the above are merely a few illustrative examples to which the disclosed subject matter is not limited.

Figure 6:
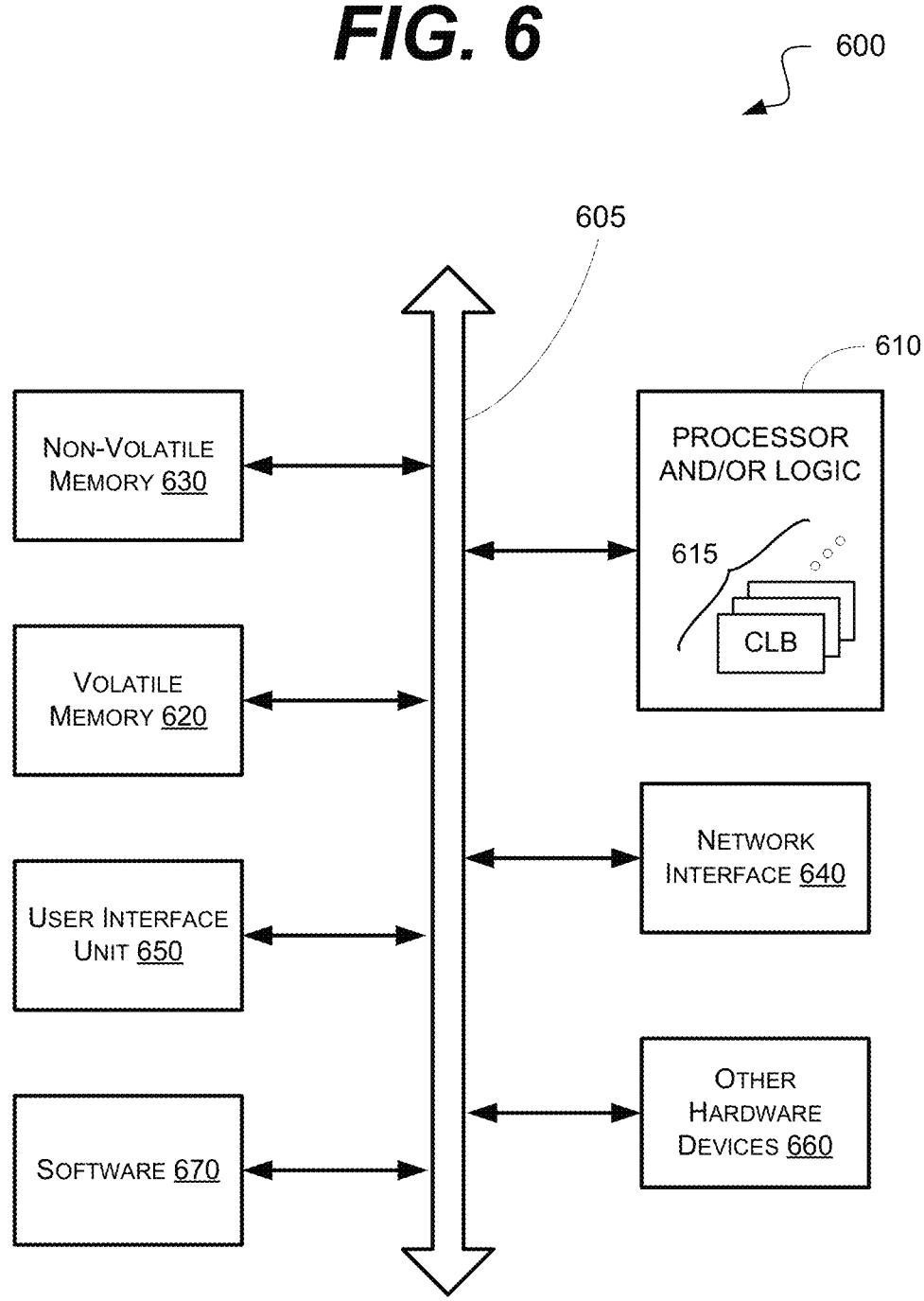
FIG. 6 is a schematic block diagram of an information processing system that may include devices formed according to principles of the disclosed subject matter.

FIG. 6 is a schematic block diagram of an information processing system 600, which may include semiconductor devices formed according to principles of the disclosed subject matter.

Referring to FIG. 6, an information processing system 600 may include one or more of devices constructed according to the principles of the disclosed subject matter. In another embodiment, the information processing system 600 may employ or execute one or more techniques according to the principles of the disclosed subject matter.

In various embodiments, the information processing system 600 may include a computing device, such as, for example, a laptop, desktop, workstation, server, blade server, personal digital assistant, smartphone, tablet, and other appropriate computers or a virtual machine or virtual computing device thereof. In various embodiments, the information processing system 600 may be used by a user (not shown).

The information processing system 600 according to the disclosed subject matter may further include a central processing unit (CPU), logic, or processor 610. In some embodiments, the processor 610 may include one or more functional unit blocks (FUBs) or combinational logic blocks (CLBs) 615. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 600 according to the disclosed subject matter may further include a volatile memory 620 (e.g., a Random Access Memory (RAM)). The information processing system 600 according to the disclosed subject matter may further include a non-volatile memory 630 (e.g., a hard drive, an optical memory, a NAND or Flash memory). In some embodiments, either the volatile memory 620, the non-volatile memory 630, or a combination or portions thereof may be referred to as a "storage medium". In various embodiments, the volatile memory 620 and/or the non-volatile memory 630 may be configured to store data in a semi-permanent or substantially permanent form.

In various embodiments, the information processing system 600 may include one or more network interfaces 640 configured to allow the information processing system 600 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., Home-Plug, IEEE 1901). It is understood that the above are merely a few illustrative examples to which the disclosed subject matter is not limited.

The information processing system 600 according to the disclosed subject matter may further include a user interface unit 650 (e.g., a display adapter, a haptic interface, a human interface device). In various embodiments, this user interface unit 650 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 600 may include one or more other devices or hardware components 660 (e.g., a display or monitor, a keyboard, a mouse, a camera, a fingerprint reader, a video processor). It is understood that the above are merely a few illustrative examples to which the disclosed subject matter is not limited.

The information processing system 600 according to the disclosed subject matter may further include one or more system buses 605. In such an embodiment, the system bus 605 may be configured to communicatively couple the processor 610, the volatile memory 620, the non-volatile memory 630, the network interface 640, the user interface unit 650, and one or more hardware components 660. Data processed by the processor 610 or data inputted from outside of the non-volatile memory 630 may be stored in either the non-volatile memory 630 or the volatile memory 620.

In various embodiments, the information processing system 600 may include or execute one or more software components 670. In some embodiments, the software components 670 may include an operating system (OS) and/or an application. In some embodiments, the OS may be configured to provide one or more services to an application and manage or act as an intermediary between the application and the various hardware components (e.g., the processor 610, a network interface 640) of the information processing system 600. In such an embodiment, the information processing system 600 may include one or more native applications, which may be installed locally (e.g., within the non-volatile memory 630) and configured to be executed directly by the processor 610 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 610.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
   a cache pre-fetcher configured to predict data to be retrieved from a memory system;
   the cache pre-fetcher comprising:
   a pattern predictor circuit configured to predict a series of memory addresses to be pre-fetched from the memory system, and
   a confirmation queue circuit configured to:
   maintain a windowed confirmation queue of predicted memory addresses,
   compare a requested memory address against the predicted memory addresses, and
   if the requested memory address is included in the predicted memory addresses, indicate that a successful pre-fetch has occurred, and dynamically remove the requested memory address from the windowed confirmation queue, freeing a space for a new predicted memory address.

2. The apparatus of claim 1, wherein the windowed confirmation queue includes up to a predefined plurality of predicted memory addresses, and wherein the windowed confirmation queue circuit is configured to, if the number of outstanding memory addresses predicted by the pattern predictor circuit is greater than the predefined plurality of predicted memory addresses, refrain from adding any more memory addresses to the windowed confirmation queue.

3. The apparatus of claim 1, wherein the windowed confirmation queue circuit is configured to, if the requested memory address is included in the predicted memory addresses:

remove the requested memory address from the windowed confirmation queue;

remove any memory addresses predicted earlier than requested memory address from the windowed confirmation queue; and refill the windowed confirmation queue by re-predicting memory addresses that were previously predicted by the pattern predictor circuit but not added to the windowed confirmation queue.

4. The apparatus of claim 1, wherein the confirmation queue circuit is configured to:

maintain a plurality of windowed confirmation queues, each for a respective address stream, compare a requested memory address of an address stream against a windowed confirmation queue associated with the address stream; and indicate a result of the comparison to the pattern predictor circuit.

5. The apparatus of claim 1, wherein the confirmation queue circuit is configured to:

divide the windowed confirmation queue into an early portion and a later portion;

determine if the requested memory address is included in the predicted memory addresses, and, if so, which portion;

adjust a degree of confidence in the prediction based upon which portion included the predicted memory address.

6. The apparatus of claim 1, wherein the confirmation queue circuit is configured to:

determine a number of skipped predicted memory addresses, if any, before the requested memory address matches one of the predicted memory addresses;

lower a level of confidence in the successful fetch based, at least in part, upon the number of skipped predicted memory addresses.

7. The apparatus of claim 6, wherein the confirmation queue circuit is configured to:

count a number of successful predictions; and indicate an increased level of confidence if the number of successful predictions exceeds a predefined threshold.

8. The apparatus of claim 7, wherein the confirmation queue circuit is configured to:

adjust the number of successful predictions based, at least in part, upon the number of skipped predicted memory addresses.

9. The apparatus of claim 1, wherein the confirmation queue circuit is configured to:

for each of the predicted memory addresses, maintain a tag that indicates whether or not the respective predicted memory address has been pre-fetched.

10. The apparatus of claim 1, wherein the confirmation queue circuit is configured to store a predicted memory address even if the predicted memory address has not been pre-fetched from the memory system.

11. A method comprising:

predicting a series of memory addresses to be pre-fetched from a memory system;

maintaining a windowed confirmation queue of predicted memory addresses;

comparing a requested memory address against the predicted memory addresses, and if the requested memory address is included in the predicted memory addresses, indicating that a successful pre-fetch has occurred, and dynamically removing the requested memory address from the windowed confirmation queue, freeing a space for a new predicted memory address.

12. The method of claim 11, wherein the windowed confirmation queue includes up to a predefined plurality of predicted memory addresses, and wherein maintaining comprises:

if a number of outstanding memory addresses predicted by the pattern predictor circuit is greater than the predefined plurality of predicted memory addresses, refrain from adding any more memory addresses to the windowed confirmation queue.

13. The method of claim 12, wherein maintaining a further comprises:

adding a predicted memory address to the windowed confirmation queue even if the predicted memory address has not been pre-fetched from the memory system.

14. The method of claim 13, wherein maintaining comprises:

associating a tag with each respective predicted memory address, wherein the tag indicates whether or not the respective predicted memory address has been, at least partially, pre-fetched from the memory system.

15. The method of claim 11, wherein, if the requested memory address is included in the predicted memory addresses:

removing the requested memory address from the windowed confirmation queue;

removing any memory addresses predicted earlier than requested memory address from the windowed confirmation queue; and refilling the windowed confirmation queue by re-predicting memory addresses that were previously predicted by the pattern predictor circuit but not added to the windowed confirmation queue.

16. The method of claim 11, wherein maintaining comprises maintaining a plurality of windowed confirmation queues, each for a respective address stream;

wherein comparing comprises comparing a requested memory address of an address stream against a windowed confirmation queue associated with the address stream; and wherein indicating comprises indicating a result of the comparison to the pattern predictor circuit.

17. The method of claim 11, wherein comparing comprises:

dividing the windowed confirmation queue into an early portion and a later portion, and determining if the requested memory address is included in the predicted memory addresses, and, if so, which portion; and wherein indicating comprises adjusting a degree of confidence in the prediction based upon which portion included the predicted memory address.

18. The method of claim 11, wherein comparing comprises:
   counting a number of successful predictions; and
   determining an increased level of confidence if the number of successful predictions exceeds a predefined threshold.

19. The method of claim 11, wherein comparing comprises determining a number of skipped predicted memory addresses, if any, before the requested memory address matches one of the predicted memory addresses; and
   indicating comprises lowering a level of confidence in the successful fetch based, at least in part, upon the number of skipped predicted memory addresses.

20. The method of claim 19, wherein indicating comprises adjusting a number of successful predictions based, at least in part, upon the number of skipped predicted memory addresses.

* * * * *